United States Patent Office 3,296,230
Patented Jan. 3, 1967

3,296,230
PROCESS FOR MAKING HEAT-STABLE HYDROXYL-CONTAINING VINYL POLYMER
George Gateff and James W. Summers, Lakewood, Ohio, assignors to The B. F. Goodrich Company, New York, N.Y., a corporation of New York
No Drawing. Filed Oct. 31, 1963, Ser. No. 320,529
15 Claims. (Cl. 260—87.1)

This invention relates to a method for producing copolymers of vinyl chloride, vinyl acetate and vinyl alcohol and copolymers of vinyl chloride and vinyl alcohol. More particularly, this invention concerns a process for producing a saturated, heat-stable hydroxyl-containing vinyl polymer by an interchange reaction, usually referred to as alcoholysis or hydrolysis, wherein all or preferably a portion of the acetate groups of a resinous vinyl chloride-vinyl acetate copolymer are replaced by hydroxyl groups. This invention also includes the thermally-stable copolymers produced according to the described method.

To make this specification more concise it is intended that in the ensuing description of the invention and the presentation of specific embodiments and examples thereof, "percents" of the constituents of copolymers and mixtures refer to "percents by weight" of the totals thereof, "parts" means "parts by weight" and ratios of reactants are weight ratios. The symbol "phr." refers to "parts per hundred" and "p.p.m." means "parts per million."

Copolymers of vinyl chloride and vinyl alcohol, and especially terpolymers of vinyl chloride, vinyl acetate and vinyl alcohol are widely used in various formulations for coating metal, wood, paper and other substrate materials. These resins are strong, flexible, chemical resistant and, because of their chemically combined hydroxyl groups, are compatible with high-boiling organic solvents, plasticizers, natural resins and thermosetting synthetic resins such as alkyd resins, phenol-formaldehyde resins, urea-formaldehyde resins, melamine-formaldehyde resins and the like.

Various methods for producing terpolymers of vinyl chloride, vinyl acetate and vinyl alcohol by alcoholysis of a vinyl chloride-vinyl acetate copolymer have been described heretofore. The process of U.S. Patent No. 2,458,639 involves hydrolysis of said copolymer in solution in an organic solvent using either an alkaline or acid catalyst. In U.S. Patent No. 2,512,726 the alcoholysis of the vinyl resin occurs in a suitable solvent containing an acid catalyst. The method taught by U.S. Patent No. 2,852,499 concerns a different solvent system and an alkaline catalyst. The disadvantages of the processes disclosed by the aforesaid patents are the difficulties and expense associated with recovering the polymer from solution and the tendency of the final product to degrade when subjected to elevated temperatures.

In U.S. Patent No. 3,021,318 a method for partially hydrolyzing and partially dehydrohalogenating a copolymer of vinyl chloride and vinyl acetate is described, which method entails forming a reaction mixture comprising a suspension of said copolymer in a liquid organic reaction medium comprising (a) a lower aliphatic alcohol containing less than 5% of water and (b) an organic swelling solvent for the copolymer, said medium having incorporated therein a strongly basic material (catalyst); maintaining said suspension at from 60° C. to 80° C. to convert 15–85% of the vinyl acetate to vinyl alcohol, and recovering the hydroxyl-containing polymer from the liquid medium. The partially-dehydrohalogenated product produced by this method is quite dark in color and has poor heat stability.

The present invention is a process encompassing a combination of steps which produces an improved hydroxyl-containing polymer of the general class above-described. Briefly stated, the invention is a method which comprises the steps of (A) converting from about 40% to essentially 100% of the acetate groups of a resinous copolymer of vinyl chloride and vinyl acetate to hydroxyl groups by forming a suspension of said copolymer in powder form in a substantially anhydrous liquid reaction medium comprising (a) a lower aliphatic alcohol containing 1 to 4 carbon atoms and (b) an organic swelling agent for said copolymer, said liquid medium containing in admixture a minor amount of an iron salt and a strongly alkaline material, and maintaining said suspension at a temperature of from about 35° C. to 55° C. in the substantial absence of oxygen for a period sufficient to achieve said conversion of the acetate groups; (B) treating the partially soluble, hydroxyl-containing polymer in said suspension with chlorine in the presence of oxygen at a temperature of from about 5 to 45° C.; and (C) recovering the product polymer from the liquid reaction medium. The foregoing process steps, conveniently designated as (A) the alcoholysis step, (B) the bleaching step and (C) the recovery step, are described under separate headings hereinbelow.

The resins adaptable to processing in accordance with this invention are copolymers made up essentially of 51 to 95% of vinyl chloride and 5 to 49% of vinyl acetate. The most suitable copolymer contains 75 to 90% vinyl chloride and 10 to 25% vinyl acetate. The vinyl chloride-vinyl acetate copolymer may also contain up to 5%, based on the combined weight of the two said essential components, of one or more other monoolefinically unsaturated monomers copolymerized therewith. These optional constituents contain a single

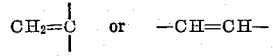

grouping. Representative monoolefinically unsaturated monomers of this type include the other vinyl halides such as vinyl bromide, vinyl fluoride, vinylidene chloride, vinylidene bromide, vinylidene fluoride, 1,2-dichloroethylene and the like; the other vinyl esters such as vinyl propionate, vinyl butyrate, vinyl benzoate, vinyl laurate, isopropenyl acetate, isopropenyl caproate and the like; the acrylate and methacrylate esters such as methyl acrylate, ethyl acrylate, propyl acrylate, isopropyl acrylate, the butyl acrylates, the amyl acrylates, the hexyl acrylates, the heptyl acrylates, the octyl acrylates, the dodecyl acrylates, phenyl acrylate, cyclohexyl acrylate, methyl methacrylate, ethyl methacrylate, the propyl methacrylates, the butyl methacrylates, the amyl methacrylates, the hexyl methacrylates, the heptyl methacrylates, the octyl methacrylates, the nonyl methacrylates, the decyl methacrylates, the dodecyl methacrylates, phenyl methacrylate, cyclohexyl methacrylate and the like; the vinyl aromatic monomers such as styrene, alpha-methyl styrene, the vinyl toluenes, the vinyl xylenes, vinyl naphthalene and the like; the monoolefins such as ethylene, propylene, the butylenes, the amylenes, the hexylenes, cyclohexene and the like; the vinyl ethers such as vinyl methyl ether, vinyl ethyl ether, the vinyl propyl ethers, the vinyl butyl ethers, the vinyl amyl ethers, the vinyl hexyl ethers, the vinyl heptyl ethers, the vinyl octyl ethers, vinyl cyclohexyl ether, vinyl phenyl ether, vinyl benzyl ether and the like; the allyl esters and ethers such as allyl acetate, allyl laurate, allyl benzoate, allyl methyl ether, allyl ethyl ether and the like.

In the modification of the vinyl chloride-vinyl acetate copolymer in accordance with this invention, ordinarily at least about 40% and usually at least about 70% of the acetate groups therein are converted to hydroxyl groups, and if extreme catalytic alcoholysis conditions are employed, virtually all of the acetate groups are hydrolyzed. However, it is preferred that from about 70 to 90% of the acetate groups be replaced by hydroxyl groups. The most desirable product, from the standpoint of the best compatibility with other materials in conjunction with good coating flexibility, is a terpolymer of 88 to 93% of vinyl chloride, 2 to 5% of vinyl acetate and 5 to 7% of vinyl alcohol obtained by the partial hydrolysis of a copolymer of 83 to 89% vinyl chloride and 11 to 17% vinyl acetate, i.e., by the conversion of from about 70% to about 90% of the acetate groups thereof to hydroxyl groups.

The alcoholysis step

The alcoholysis of the vinyl chloride-vinyl acetate copolymer is carried out on a suspension of the polymer in the liquid reaction medium. This slurry of resin and diluent may contain from about 10% to 50% of resin solids although from about 30 to 40% of solids are preferred. The copolymer is accordingly charged in a finely-divided particulate form, for example, wherein the particles have an average diameter within the range of about 10 to about 1000 microns. Since the reaction rate is faster when smaller particles are used, the preferred average particle size is from about 10 to about 150 microns.

The reaction medium comprises a mixture of (a) a lower aliphatic monohydric alcohol of the formula ROH where R is an alkyl group containing from 1 to 4 carbon atoms and (b) a non-hydrolyzable, active swelling agent for the resin particles. Representative alcohols embodied herein include methanol, ethanol, n-propanol, iso-propanol, n-butanol, iso-butanol and the like which conform to the aforesaid formula. Methanol is preferred. The vinyl chloride-vinyl acetate copolymer has neglible solubility in the alcohol diluent. On the other hand, the active swelling agent is an organic liquid which is normally a solvent for the vinyl resin, but is present in the reaction medium in a limited amount, which amount is absorbed by the copolymer particles causing appreciable swelling thereof, but which amount is insufficient to change the particulate characteristics of the suspension as by agglomeration or coalesence of the particles. It has also been found that the concentration of the swelling solvent in the mixture has a pronounced effect on the reaction rate; the time required to achieve a comparable degree of hydrolysis decreases as the amount of swelling agent is increased. The operable range of swelling solvent is from about 20 to 80 parts per 100 parts of resin with from about 30 to 60 parts being preferred. Suitable swelling agents include the ketones such as the dialkyl ketones, e.g., acetone, methyl ethyl ketone and methyl isobutyl ketone, and the aromatic ketones, e.g., cyclohexanone; cyclic ethers such as dioxane and tetrahydrofuran; and aromatic hydrocarbons such as benzene, toluene, xylene and ethyl benzene. Solvents of the ester type, e.g., ethyl acetate, should be avoided because they are subject to hydrolysis and will interfer with the alcoholysis reaction. The above list of swelling agents is merely exemplary since the use of any solvent which is inert with respect to the hydrolysis reaction and which swells the copolymer particle, thereby promoting more intimate contact of the alcohol and catalyst therewith, is contemplated. Acetone is the preferred solvent because it is an efficient swelling agent and has several economic advantages such as ease of recovery and intial low cost.

The reaction medium, i.e., the mixture of aliphatic alcohol and swelling agent, must be of a substantially anhydrous nature. Water retards the reaction rate, poisons the catalyst and promotes the formation of an inferior product. The reaction medium may contain a maximum of about two percent moisture, however, it is preferred that there be less than about 0.5% water therein.

It is essential that the alcoholysis reaction be carried out in a substantially oxygen-free medium. It has been found that oxygen present during the reaction increases discoloration and lessens heat stability of the resin. The term "in a substantially oxygen-free medium" means that all traces of oxygen may not have been excluded from the system, but refers to a system in which sufficient precautions are observed and adequate measures are employed to reduce the oxygen contamination in the diluent and in the reactor free space to a minimum before reaction is initiated, and further, insuring this condition during reaction. Typical precautionary techniques include such operations as replacing the air in the reactor with an inert gas such as nitrogen or carbon dioxide, or pulling a vacuum on the reactor, "breaking" the vacuum with an inert gas and maintaining a blanket (slight positive pressure) of inert gas on the system, or conducting the reaction under vacuum conditions, i.e., at reduced pressures of about 5 to 10 lbs./sq. inch absolute. As a practical matter, the reaction medium should contain not more than about 100 parts per million of oxygen.

In accordance with the process of this invention, the catalyst system comprises a combination of two components, an iron salt and a strongly basic material. The iron salt appears to exert most of its catalytic action during the bleaching step (described hereinbelow), however, the best results are achieved when it is added to the reaction mixture before the addition thereto of the basic catalyst.

Typical strongly alkaline catalysts useful in the process are the alkali metal hydroxides, alkali metal alcoholates, quaternary ammonium hydroxides and the like, for example, the hydroxide, methylate, and ethylate of sodium or potassium, tetramethyl ammonium hydroxide, tetraethyl ammonium hydroxide and N-benzyl—trimethyl ammonium hydroxide. The basic catalyst activates and accelerates the alcoholysis or interchange reaction which converts a portion or all of the vinyl acetate segments of the copolymer to vinyl alcohol segments via the reaction:

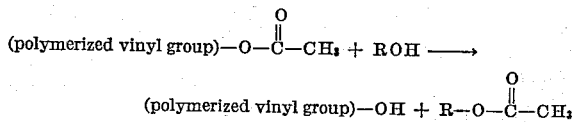

ROH is the lower aliphatic alcohol as previously defined. The alcoholysis reaction requires no induction period and is initiated by the introduction of the alkaline catalyst into the suspension.

Occurring simultaneously with the alcoholysis of the acetate groups of the copolymer is a second and detrimental reaction, partial dehydrohalogenation of the vinyl chloride segments of the copolymer. This unavoidable dehydrohalogenation introduces a minor amount of unsaturation into the polymer chain; in fact, the HCl lost by the polymer is only on the order of about 0.1–0.5% of the total polymer weight. However, this small amount of unsaturation is responsible for pronounced discoloration of the resin. As the reaction proceeds, there are several stages of resin discoloration; it passes from the original white to yellow, then a greenish yellow and finally orange. Moreover, the hydrogen chloride which is evolved in this secondary reaction reacts with the basic catalyst, thus lessening its alkaline catalytic effectiveness and arresting the alcoholysis reaction. This otherwise undesirable feature of the reaction mechanism is one of the factors which permits reasonable control of the degree of hydrolysis of the polymer (relative number of acetate groups converted to hydroxyl groups), i.e., by selecting the proper concentration of catalyst consistent with the initial vinyl acetate content of the copolymer and the degree of hydrolysis desired while taking into consideration the catalyst which will be neutralized by the HCl evolved. The alkaline catalyst concentration generally is within the range of about one to four parts per 100 parts of resin with from about 1.5 to 2.5 phr. usually being sufficient. The preferred basic catalyst is potassium hydroxide because a lighter colored and more stable hydroxyl-containing polymer is obtained therewith.

The iron salt which is desirably admixed with the polymer slurry prior to the initiation of the alcoholysis reaction may be any iron salt (ferrous or ferric) which is soluble in the alcohol diluent in the amounts used and from which ferric hydroxide is formed when said salt is contacted by the strongly basic catalyst. The iron salt is added in an amount sufficient to provide from about 20 parts to about 1000 parts of iron per million parts of the vinyl chloride-vinyl acetate resin; from about 100 to about 400 p.p.m. of iron are preferred. Representative of the iron salts suitable in the present process are those disclosed in U.S. Patent No. 2,563,772 as being useful as heat and light stabilizers for halogen-containing polymers, for example, ferric acetate, ferric arsenate, ferric formate, ferrous formate, ferric hydrophosphite, ferric sulfate, ferric oxalate, ferric tartarate, ferrous acetate, ferrous carbonate, ferrous ammonium sulfate, ferrous iodide, ferrous lactate, ferrous thiosulfate, ferrous tartarate, especially the iron chlorides, ferrous and ferric chloride, and the like and mixtures of the iron salts. Although the iron salt does have some heat stabilizing effect on the product polymer, it is added primarily to subsequently serve as a directional addition catalyst during the bleaching step. It is also noteworthy that any advantages imparted to the resin by the iron salt's function as a stabilizer are enhanced by its addition to the reaction mixture prior to the alkaline catalyst addition. These unusual results and conclusions are substantiated by experimental data presented later in this specification.

The aforesaid minor amount of iron salt, which is solubilized in the alcohol-swelling agent reaction medium and is well dispersed throughout, reacts with a correspondingly small amount of the strongly basic catalyst subsequently added to the mixture, thereby forming a precipitate of insoluble ferric hydroxide which is uniformly deposited on the polymer particles where it remains during alcoholysis and bleaching. In the less preferred alternative procedure where either before or after alcoholysis, ferric hydroxide or preferably an iron salt capable of producing same are added to the slurry already containing the alkaline catalyst, the ferric hydroxide will not be as well dispersed throughout the mixture and its contact with the resin particles will be less intimate. As a result, the quality of the product polymer will be somewhat poorer than in the preferred embodiment.

It has been found that the temperature of the alcoholysis reaction should be at least 30° C. in order to obtain a good rate of reaction. It has also been discovered that at temperatures above 55° C., the product is comparatively heat-unstable. The best results are noted when the reaction is carried out at about 40-50° C. Agitation of the reaction mixture is of a nature sufficient to keep the slurry in suspension and to ensure good contact between the reactants incorporated therein. Reaction periods vary from about 30 minutes to two hours, however, about 45 minutes is usually sufficient time in which to accomplish the desired amount of hydrolysis. As the reaction proceeds, an increase in slurry viscosity is noted due to the fact that the hydroxyl-containing polymer has greater solubility in the reaction medium than the untreated resin. The reaction may be terminated by adding an acid to the mixture to neutralize the basic catalyst, for instance, hydrochloric acid, nitric acid, sulfuric acid, acetic acid, etc.

The bleaching step

In order to obtain a hydroxyl-containing copolymer that is saturated and colorless, the dark orange, dehydrochlorinated resin received from the alcoholysis step is treated with chlorine, the technique being nominally referred to as "bleaching." The operation involves intimately contacting the slurry (mixture of alcohol, swelling agent, particulate polymer and ferric hydroxide) with gaseous chlorine, most conveniently performed by bubbling or sparging the gas into the mixture.

The slurry is treated with chlorine at an approximately neutral pH, i.e., a pH of about 6 to 9. As aforementioned, the pH of the alkaline mixture may be advantageously adjusted by adding an acid thereto, preferably an inorganic mineral acid such as hydrochloric, sulfuric, or nitric acid, although gaseous chlorine in contact with the slurry will in a short time reduce the pH to the point where the bleaching reaction starts. The bleaching may be carried out at from about 5 to about 45° C., although the temperatures within the range of 5 to 25° C., are most preferred. High bleaching temperatures should be avoided as a high temperature serves to encourage the substitution of chlorine for hydrogen atoms in the polymer chain rather than addition of chlorine at the sites of unsaturation. Furthermore, there is a tendency to chlorinate the solvents at elevated temperatures.

In contrast to the alcoholysis reaction which is carried out in the substantial absence of oxygen, it has been discovered that the bleaching must be conducted in the presence of oxygen. There are two important reasons for the requirement. Firstly, it has been found that if chlorine is contacted with the dehydrohalogenated polymer slurry in the substantial absence of oxygen, there is a tendency for the flammable diluents (alcohol and swelling solvent) to burn. It is believed that the flash fire is initiated by the formation of active chlorine free-radicals in the mixture. Oxygen reduces the formation of the free-radicals and eliminates the fire hazard. Aside from the safety considerations, it has been found that polymers chlorinated in the presence of oxygen ultimately exhibit better color and heat stability and enhanced compatability with other synthetic resins than those chlorinated in the substantial absence of oxygen. Accordingly, it is an essential expedient to bleach the colored, unsaturated, hydroxyl-containing polymer in the presence of oxygen, for example, with a mixture of chlorine and oxygen or an oxygen-containing gas such as air. The ratio of chlorine to oxygen in the gaseous mixture passed into and through the slurry may range from about 100:1 to 1:20.

The bleaching operation involves a relatively rapid reaction and requires at the maximum only about ten minutes to restore the resin to its original white color. Generally, from about 0.1 to about 1 part of chlorine per 100 parts of resin are consumed in the reaction; the rest is bubbled through the slurry and may be recovered for recycling. Residual unreacted chlorine remaining in the slurry after the reaction is completed may be removed therefrom by sparging the slurry with air and/or applying a vacuum to the reaction vessel.

As stated previously, a minor amount of ferric hydroxide must be in the slurry during bleaching in order to obtain vinyl alcohol-containing resins with consistently good heat stability. The mechanism by which the iron acts to produce a more heat stable resin is not known although two theories are advanced. One possibility is that the ferric hydroxide may act to eliminate or retard some unknown detrimental side reaction during chlorination. More credence is given to the theory that the iron compound has a pseudo-catalytic directional effect in (1) promoting the addition of chlorine at the sites of unsaturation in the polymer carbon chain in preference to its substitution for hydrogen atoms therein and (2) the ferric hydroxide directs the cholrine into a more stable spatial (steric) configuration in relation to the polymer chain.

*The recovery step*

It has been discovered that the light stability of the hydroxyl-containing copolymer is inversely proportional to its iron content. Therefore, the product resin generally should contain no more than about 10 ppm. of iron if a product having good light stability is desired. Greater amounts of residual iron will encourage degradation and discoloration of the resin upon its prolonged exposure to light. Consequently, the polymer recovery step generally includes measures designed to reduce the residual iron content of the resin. A convenient method utilizes the well known tact of forming a water-soluble complex of the iron with a sequestering agent.

The pH of the polymer slurry received from the bleaching step is normally within the range of 6 to 7. To facilitate iron removal therefrom, sufficient hydrochloric acid or other mineral acid is mixed with the slurry to reduce the pH to from about 1 to 3. The insoluble ferric hydroxide in the mixture is thus converted to soluble ferric chloride or other ferric salt. A slightly elevated temperature, e.g., about 35 to 50° C., aids the conversion. A conventional sequestering agent, also commonly known as a chelating agent, is then added to the mixture. The amount of sequestrant may reside within the range of 0.2 to 2 parts per hundred parts of resin, depending on the iron content of the slurry and the degree of removal desired. Any suitable sequestering agent may be used; more specifically, the chelator is one having the ability to form a complex with iron under acid conditions, which iron-chelate complex is soluble both in the reaction medium (alcohol and swelling agent) and in water. The organic sequestering agents are preferred, for instance, the amino polycarboxylic acids such as nitrilotriacetic acid, ethylenediaminetetraacetic acid and diethylenetriaminepentacetic acid, and the hydroxy carboxylic acids such as gluconic acid, citric acid and tartari acid, and the sodium salts of the aforesaid acids. Of course, this list of chelating agents is merely representative and not limiting since the use of any operable iron sequestrant is contemplated. A brief description of sequestering agents is found at pages 164–180 of volume 12 of the "Encyclopedia of Chemical Technology," by Kirk and Othmer, the Interscience Encyclopedia Inc., New York, N.Y. (1954).

Subsequent to the iron sequestration operation, which may or may not have been necessary depending on the properties of the product desired and the uses to which it will be applied, the acid slurry is neutralized so that the pH is from about 6 to 8. Either a weak or strong base is a suitable neutralizing agent, for example, sodium carbonate, sodium acetate, sodium hydroxide, potassium hydroxide and the like. As aforementioned, a small portion of the hydroxyl-containing polymer, e.g., 5 to 15%, is soluble in the reaction medium. It is of course economically expedient to recover this soluble polymer from the diluent; it is advantageously precipitated from solution by adding water to the suspension, about 20 to about 200 parts of water per 100 parts of total polymer.

The product polymer is next separated from the diluent by suitable liquid-solid separation means such as by centrifugation or more preferably by filtration. If the slurry has poor filtration characteristics due to the resin being somewhat sticky, much of the diluent, including added water, may be removed prior to filtration by decantation of the liquid phase. In an alternative procedure, up to about 75% of the alcohol-swelling solvent reaction medium may be removed by distillation before the water is added to the cooled mixture to precipitate the soluble fraction. The filtration in all cases is at ambient temperatures, e.g. 20 to 40° C. The resin is washed with water to remove most of the water-soluble solvents and other occluded contaminants. It is dried in conventional apparatus such as a tray dried, fluidized bed drier, vacuum drier, pipeline-air drier or tumbler drier at 30 to 110° C., depending on the type of drier used and the contact time needed. For driers requiring the longer contact periods, such as the tray type, lower drying temperatures are preferred to minimize any discoloration. The dried product is a white to slightly yellow powder with a particle size distribution closely resembling that of the original untreated resin.

EXAMPLES

The examples that follow not only serve to illustrate and clarify the process of the present invention but, in addition, set out the novelty of the criticality of various reaction conditions. It should be understood, however, that the examples are for purposes of illustration only and should not be construed to limit the scope of the invention as defined by the appended claims. The symbol (–) in a table of data indicates that the particular determination was not made.

In the experiments described below, the vinyl chloride-vinyl acetate resin subjected to the alcoholysis and bleaching in the manners as set forth is a copolymer of 85 to 87% vinyl chloride and 13 to 15% vinyl acetate, utilized in powder form of which the average particle diameter ranges from about 10 to about 150 microns. The resin is known commercially as "Geon 427" (product of The B. F. Goodrich Chemical Company, Cleveland, Ohio). The reaction medium consisted of a mixture of three parts of methanol per one part of acetone; the slurry of the polymer and the liquid diluent contained about 33 to 35% solids. The strongly alkaline catalyst was potassium hydroxide charged as a 20% solution in methanol. The basic catalyst concentration was such that approximately 80% of the vinyl acetate groups of the polymer were converted to vinyl alcohol groups, so that the final product, after chlorination, was a terpolymer of 90 to 92% vinyl chloride, 2 to 4% vinyl acetate and 5.5 to 6.5% vinyl alcohol. These hydroxyl-containing copolymers were characterized with respect to vinyl alcohol equivalency and general quality according to the following procedures.

*Vinyl alcohol content*

The vinyl alcohol content of a vinyl chloride/vinyl acetate/vinyl alcohol experimental terpolymer was determined spectroscopically by comparing the resin to a control terpolymer of the same constituents in known amounts for which the hydroxyl content had been determined by a standard chemical analytical procedure. The standard resin contained 6% vinyl alcohol. The comparisons were made using a Perkin-Elmer Model 4000 Spectracord to measure the absorbance of the polymers in methylene chloride solution at a wave length of 2.77 microns (about eight grams of polymer, measured within an accuracy of 0.0001 gram, per liter of solvent). The absorptivity, $k$, was calculated as:

$$k = \frac{\text{absorbance}}{\text{concentration in grams per liter}}$$

The vinyl alcohol content of the experimental polymer sample was calculated as:

vinyl alcohol content of sample =

$$\frac{k \text{ of sample}}{k \text{ of control polymer}} \times 6\%$$

*Compatibility with other synthetic resins*

The compatibility of the terpolymer with alkyd-type and nitrogen-type resins was characterized, using as the standard—"Duraplex ND–77–B" (a product of Rohm and Haas Company), a non-oxidizing, phthalic acid type alkyd resin. The test method involved a visual determination of mutual solubility. 10 parts of the terpolymer were dissolved in a mixture of 30 parts toluene and 10 parts acetone and to this solution were added 10 parts of the alkyd resin. Cloudiness or phase separation of the resulting solution indicated incompatibility of the resins while compatibility was indicated by a clear solution.

Solution testing

A solution of 20 parts of resin in 80 parts of solvent consisting of 67% toluene and 33% acetone was prepared and the clarity and color thereof were noted. Iron content of the resin was determined by the well-known method of developing the color in the resin solution with potassium thiocyanate and comparing its color with that of a solution containing a known concentration of iron.

Heat stability

A series of clear, transparent, 6 mil films were cast from the above-described solution and after solvent removal and drying at 70° F., the films were placed in a 300° or 350° F. oven. Samples were removed at regularly scheduled intervals and the clarity and depth of the film were measured as the reflectance value in a photo-volt reflectometer. The standard reading on the reflectometer for a completely transparent film is 77.5 units. The readings obtained are proportionately less as the film darkens, according to the following approximate visual comparisons.

Reflectometer
reading:                  Appearance
  70–77.5 ____ Transparent and colorless.
  60–70   ____ Transparent and faint yellow tinge.
  50–60   ____ Yellow to brown and less transparent.
  40–50   ____ Dark brown and slightly transparent.
  Below 40 __ Dark brown to black and opaque.

Light stability

The light stability of the resin was determined using a "Fade-Ometer" which is an apparatus designed for accelerated light aging of materials under the action of artificial light from an electric arc between carbons that have been treated to produce a spectrum closely resembling that of sunlight. The relative degradation of polymer films (6 mils thick) after varying periods in the Fade-Ometer was measured by noting the reflectance in the photo-volt reflectometer as described above.

EXAMPLE I

This series of experiments illustrates the adverse effects on the resin resulting from the presence of oxygen during the alcoholysis reaction. The reaction mixture contained 1.5 parts of potassium hydroxide per 100 parts of resin. Iron salt addition was omitted in order to eliminate the effect of this variable in this group of tests. The alcoholysis temperature was 35–51° C. The hydrolyzed, unsaturated resin was chlorinated by bubbling a chlorine/air mixture (1 to 2 ratio) through the slurry. The dried, product terpolymer contained from 5.7 to 6.2% vinyl alcohol groups. Prior to the initiation of the alcoholysis reaction (by adding the alkaline catalyst to the slurry) the following measures were taken with regard to the oxygen contamination in the reactor then containing the feed resin and diluent.

In Experiment 1, the air in the reactor was not replaced by an inert gas nor any other precaution taken. In Exp. 2, a vacuum was pulled on the reactor and the system maintained at 5 to 10 p.s.i.a. during reaction. In Exp. 3, a vacuum was pulled on the reactor to a pressure of 10 p.s.i.a. and the vacuum purged with nitrogen. The system was subsequently maintained under a positive nitrogen pressure during the alcoholysis. The following summary shows the improvement in quality of the product as the precautions taken against oxygen contamination during alcoholysis became more rigorous.

| Experiment No. | Heat Stability of Terpolymer at 300° F., Reflectance Value after— | | | |
|---|---|---|---|---|
| | 0 min. | 10 min. | 20 min. | 30 min. |
| 1 | 72 | 54 | 35 | 32 |
| 2 | 72 | 68 | 54 | 24 |
| 3 | 74 | 74 | 65 | 56 |

In the rest of the experiments described below, the prealcoholysis technique was in all cases essentially that as described in Experiment 3, thereby consistently effecting the alcoholysis reactions in substantially oxygen-free reaction media.

EXAMPLE II

The experiments set forth in this example specifically illustrate the necessity of oxygen in the chlorine treatment of the partially dehydrohalogenated and unsaturated terpolymer. The alcoholyses were conducted at 40 to 48° C. with 1.5 phr. of alkaline catalyst to produce terpolymers containing about 5.6 to 6.1% of vinyl alcohol. The chlorine bleach was carried out at 24 to 26° C. for 3 to 10 minutes. In Experiments 4 and 5, the chlorinations were accomplished by passing undiluted gaseous chlorine through the slurry. A solvent fire occurred during the chlorination in Experiment No. 4. In Experiment 6, the bleaching was effected with a mixture of chlorine and air in a weight ratio of 1:2. The resins from Experiments 5 and 6 were separated from their suspensions, dried and physically characterized to assess their comparative quality. The results, which are tabulated below, show the significant improvement in color and heat-stability due to the oxygen present during chlorination.

| Experiment No. | Product Resin | | | | | |
|---|---|---|---|---|---|---|
| | Solution color | Heat Stability at 350° F., Reflectance Value after— | | | | |
| | | 0 min. | 10 min. | 20 min. | 30 min. | 60 min. |
| 5 | Very dark yellow. | 64 | 54 | 41 | 39 | 35 |
| 6 | Light yellow. | 72 | 70 | 52 | 44 | 41 |

EXAMPLE III

The series of experiments summarized in Table A below show the necessity for having the ferric hydroxide in the polymer suspension during the chlorination. The data also show the desirability of adding the iron salt to the polymer before alcoholysis is begun. In some experiments the iron was added before alcoholysis, in others before bleaching, and in others after bleaching. The iron was extracted from the reaction mixture at different stages of the multi-step process.

The alcoholysis reactions were at 44 to 46° C. using 1.75 phr. of KOH catalyst. The chlorination was at 18 to 20° C. with a 1:1 chlorine to air mixture. When the iron was removed by sequestration, as indicated in the Table A, the chelating agent employed was trisodium hydroxyethylenediaminetriacetate. The product resins contained about 6% vinyl alcohol groups. The data show that the effect of the iron is more than that of a mere stabilizing agent, but when it is used in accordance the method embodied herein, its beneficial effect is unexpectedly increased.

TABLE A.—EFFECT OF IRON ADDITION ON HEAT STABILITY OF PRODUCT RESIN

| Experiment No. | Ferric Chloride Added (as FeCl$_3$.6H$_2$O) | | Product Resin | | | | |
|---|---|---|---|---|---|---|---|
| | Amount, p.p.m. | When added and other remarks | Iron content, p.p.m. | Heat Stability at 350° F., Reflectance Value after— | | | |
| | | | | 0 min. | 15 min. | 30 min. | 60 min. |
| 7 | 0 | (Control) | 0 | 75 | 42 | 46 | 47 |
| 8 | 5 | Added to Product Resin | 1 | 76 | 49 | 40 | 40 |
| 9 | 10 | ___do___ | 2 | 76 | 51 | 42 | 46 |
| 10 | 50 | ___do___ | 10 | 76 | 58 | 51 | 50 |
| 11 | 100 | ___do___ | 21 | 76 | 61 | 57 | 53 |
| 12 | 500 | ___do___ | 103 | 77 | 57 | 57 | 52 |
| 13 | 1,000 | ___do___ | 207 | 77 | 51 | 49 | 43 |
| | | Added to Reaction Mixture: | | | | | |
| 14 | 1,000 | Added before alcoholysis, most removed by chelation before bleaching. | 2 | 76 | 35 | 35 | 43 |
| 15 | 1,000 | Added before alcoholysis, most removed by chelation after bleaching. | 6 | 75 | 70 | 66 | 66 |
| 16 | 1,000 | Added before alcoholysis, no chelation after bleaching. | 62 | 76 | 70 | 70 | 63 |
| 17 | 1,000 | Added before bleaching, most removed by chelation after bleaching. | 4 | 74 | 65 | 64 | 62 |

EXAMPLE IV

The procedure used in these experiments was the same as described in the preceding example except in all cases the ferric chloride was charged before alcoholysis. The iron was partially sequestered after chlorination so that variable portions thereof remained in the dried terpolymer products. The results shown in Table B demonstrate the detrimental effect of residual iron on the light stability of the resins.

TABLE B.—EFFECT OF IRON ON LIGHT STABILITY OF PRODUCT RESIN

| Experiment No. | FeCl$_3$.6H$_2$O added to Reaction Mixture before Alcoholysis, p.p.m. | Product Resin | | | | | | | |
|---|---|---|---|---|---|---|---|---|---|
| | | Iron, p.p.m. | Heat Stability at 350° F., Reflectance value after | | | | | Light Stability in Fade-Ometer, Reflectance Value after— | |
| | | | 0 min. | 10 min. | 20 min. | 30 min. | 60 min. | 100 hours | 200 hours |
| 18 | [1] 0 | 0 | 73 | 67 | 51 | 46 | 46 | 75 | 74 |
| 19 | 1,000 | 4 | 75 | 74 | 67 | 64 | 63 | 69 | 63 |
| 20 | 1,000 | 6 | 75 | 73 | 70 | 66 | 66 | 61 | 50 |
| 21 | 1,000 | 8 | 75 | 74 | 66 | 64 | 62 | 57 | 44 |
| 22 | 500 | 10 | 73 | 71 | 66 | 63 | 62 | 64 | 42 |
| 23 | 1,000 | 21 | 74 | 72 | 68 | 64 | 63 | 32 | 7 |
| 24 | 1,000 | 62 | 72 | 66 | 63 | 62 | 61 | 9 | 4 |

[1] Control.

The hydroxyl-containing copolymers made in accordance with the process of the present invention have, in addition to greater heat stability, lighter color, improved solubility in common solvents and greater compatibility with other resins than copolymers of similar composition produced according to the methods of the prior art. For example, the resins of this invention produce clear, slightly yellow solutions in the toluene-acetone solvent. In contrast, if any of the necessary elements of the process are omitted, a solution of the product resin is dark yellow and/or cloudy. Mixtures of the copolymers of this invention with an alkyd resin, a urea-formaldehyde resin, phenolic or rosin modified phenolic resins, a maleic-rosin type resin or the like form clear films showing good compatibility of the components, while mixtures of the said natural and thermosetting resins with copolymers produced by processes deviating from that embodied herein ordinarily form cloudy films.

We claim:

1. A process for producing a heat-stable hydroxyl-containing polymer comprising the steps of (A) forming a suspension of a copolymer of essentially 51 to 95% by weight of vinyl chloride and 5 to 49% by weight of vinyl acetate in particulate form in a liquid, substantially anhydrous reaction medium comprising (a) a lower aliphatic alcohol containing from 1 to 4 carbon atoms and (b) an organic solvent that swells the copolymer, said solvent present in an amount insufficient to change the particulate characteristics of the suspension, said reaction medium containing in admixture an iron salt capable of forming ferric hydroxide when contacted with a strong base, said iron salt being present in an amount sufficient to provide from about 20 to about 1000 parts of iron per million parts by weight of said copolymer; adding a strongly basic material to said suspension and maintaining said suspension in the substantial absence of oxygen at from 35° C. to 55° C. for a period of time sufficient to convert at least about 40% of the acetate groups of said copolymer to hydroxyl groups; (B) chlorinating the resulting hydroxyl-containing polymer in said suspension at a pH of about 6 to 9 in the presence of oxygen at a temperature of from about 5° C. to 45° C.; and (C) separating the polymer from the reaction medium.

2. The heat-stable hydroxyl-containing polymer prepared by the process of claim 1.

3. A process as defined in claim 1 wherein subsequent to the chlorination step (B), the suspension is treated at a pH of from about 1 to 3 with a sequestering agent for iron, thereby forming an iron-chelate complex which is soluble in the reaction medium; and (C) adding water to the suspension and separating the polymer from the reaction medium.

4. The heat-stable and light-stable hydroxyl-containing polymer produced by the process of claim 3.

5. A process for producing a heat-stable hydroxyl-containing polymer comprising the steps of (A) forming a suspension of a copolymer of essentially 75 to 90% by weight of vinyl chloride and 10 to 25% by weight of vinyl acetate in particulate form in a liquid, substantially anhydrous reaction medium comprising (a) a lower aliphatic alcohol containing from 1 to 4 carbon atoms and (b) an organic solvent that swells the copolymer, said solvent present in an amount insufficient to change the particulate characteristics of the suspension, said reaction medium containing in admixture an iron salt capable of forming ferric hydroxide when contacted with a strong base, said iron salt being present in an amount sufficient to provide from about 20 to about 1000 parts of iron per million parts by weight of said copolymer; adding a strongly basic material to said suspension and maintaining said suspension in the substantial absence of oxygen at from 40° C. to 50° C. for a period of time sufficient to convert at least about 40% of the acetate groups of said copolymer to hydroxyl groups; (B) chlorinating the resulting hydroxyl-containing polymer in said suspension at a pH of about 6 to 9 in the presence of oxygen at a temperature of from about 5° C. to 25° C.; and (C) separating the polymer from the reaction medium.

6. A process for producing a heat-stable hydroxyl-containing polymer comprising the steps of (A) forming a suspension of a copolymer of essentially 75 to 90% by weight of vinyl chloride and 10 to 25% by weight of vinyl acetate in particulate form in a liquid, substantially anhydrous reaction medium comprising (a) a lower aliphatic alcohol containing from 1 to 4 carbon atoms and (b) an organic solvent that swells the copolymer, said solvent present in an amount insufficient to change the particulate characteristics of the suspension; adding a strongly basic material to said suspension and maintaining said suspension in the substantial absence of oxygen at from 35° C. to 55° C. for a period of time sufficient to convert at least about 40% of the acetate groups of said copolymer to hydroxyl groups; (B) chlorinating the resulting hydroxyl-containing polymer in said suspension at a pH of about 6 to 9 in the presence of oxygen at a temperature of from about 5° C. to 45° C., said suspension containing in admixture, during the chlorination, ferric hydroxide in an amount sufficient to provide from about 20 to about 1000 parts of iron per million parts by weight of said polymer; and (C) separating the polymer from the reaction medium.

7. A process as defined in claim 6 wherein after the chlorination step (B), the suspension is treated at a pH of from about 1 to 3 with a sequestering agent for iron, thereby forming an iron-chelate complex which is soluble in the reaction medium; and (C) separating the polymer from the reaction medium.

8. The heat-stable and light-stable hydroxyl-containing polymer produced by the process of claim 7.

9. A process for producing a heat-stable terpolymer of 88 to 93% by weight of vinyl chloride, 2 to 5% by weight of vinyl acetate and 5 to 7% by weight of vinyl alcohol comprising the steps of (A) forming a suspension of a copolymer of 83 to 89% by weight of vinyl chloride and 11 to 17% by weight of vinyl acetate in powder form in a liquid, substantially anhydrous reaction medium consisting of a mixture of methanol and acetone, said suspension containing from about 10% to 50% by weight of said copolymer and from about 20 to 80 parts of acetone per 100 parts by weight of said copolymer, said reaction medium containing in admixture an iron salt capable of forming ferric hydroxide when contacted with a strong base, said iron salt being present in amount sufficient to provide from about 20 to about 1000 parts of iron per million parts by weight of said copolymer; adding from 1 to 4 parts of a strongly basic material per one hundred parts by weight of said copolymer to said suspension and maintaining said suspension in the substantial absence of oxygen at from 35° C. to 55° C. for a period of time sufficient to convert from about 70% to about 90% of the acetate groups of said copolymer to hydroxyl groups; (B) chlorinating the resulting hydroxyl-containing polymer in said suspension at a pH of about 6 to 9 in the presence of oxygen and at a temperature of from about 5° C. to 45° C.; and (C) separating the polymer from the reaction medium.

10. The heat-stable terpolymer produced by the process of claim 9.

11. A process as recited in claim 9 wherein subsequent to the chlorination step (B), the suspension is admixed at a pH of from about 1 to 3 with an iron sequestrant, thereby forming an iron-chelate complex which is soluble in the reaction medium; and (C) separating the polymer from the reaction medium.

12. The heat-stable and light-stable terpolymer produced by the process of claim 11.

13. A process for producing a heat-stable terpolymer of 88 to 93% by weight of vinyl chloride, 2 to 5% by weight of vinyl acetate and 5 to 7% by weight of vinyl alcohol comprising the steps of (A) forming a suspension of a copolymer of 83 to 89% by weight of vinyl chloride and 11 to 17% by weight of vinyl acetate in powder form in a liquid, substantially anhydrous reaction medium consisting of a mixture of methanol and acetone, said suspension containing from about 30% to 40% by weight of said copolymer and from about 30 to 60 parts of acetone per 100 parts by weight of said copolymer, said reaction medium containing in admixture an iron chloride in an amount sufficient to provide from about 20 to about 1000 parts of iron per million parts by weight of said copolymer; adding from 1 to 4 parts of potassium hydroxide per 100 parts by weight of said copolymer to said suspension and maintaining said suspension in the substantial absence of oxygen at from 35° C. to 55° C. for a period of time sufficient to convert from about 70% to about 90% of the acetate groups of said copolymer to hydroxyl groups; (B) contacting the resulting hydroxyl-containing polymer in said suspension with gaseous chlorine at a pH of about 6 to 9 in the presence of oxygen and at a temperature of from about 5° C. to 25° C.; and (C) separating the polymer from the reaction medium.

14. The process according to claim 13 where in step (A), the iron chloride is ferric chloride in an amount sufficient to provide from about 100 to 400 parts of iron per million parts of said copolymer, the amount of potassium hydroxide is from about 1.5 to 2.5 parts per 100 parts of said copolymer, and the suspension is maintained at about 40° C. to 50° C. to produce the hydroxyl-containing polymer; and in step (B), the polymer is contacted with a mixture of gaseous chlorine and an oxygen containing gas.

15. A process as recited in claim 14 wherein following the chlorination step (B), the suspension is admixed at a pH of from about 1 to 3 with an iron sequestrant, thereby forming an iron-chelate complex which is soluble in the reaction minimum; and (C) separating the polymer from the reaction medium.

No references cited.

JOSEPH L. SCHOFER, *Primary Examiner.*

M. L. BERCH, *Assistant Examiner.*